Aug. 26, 1924.

H. C. RICKETTS 1,506,718

APPARATUS FOR TREATING FRUIT AND THE LIKE

Filed June 7, 1923        2 Sheets-Sheet 1

Inventor
H. C. Ricketts,
By Steward & McKay
his Attorneys

Aug. 26, 1924.
H. C. RICKETTS
1,506,718
APPARATUS FOR TREATING FRUIT AND THE LIKE
Filed June 7, 1923    2 Sheets-Sheet 2
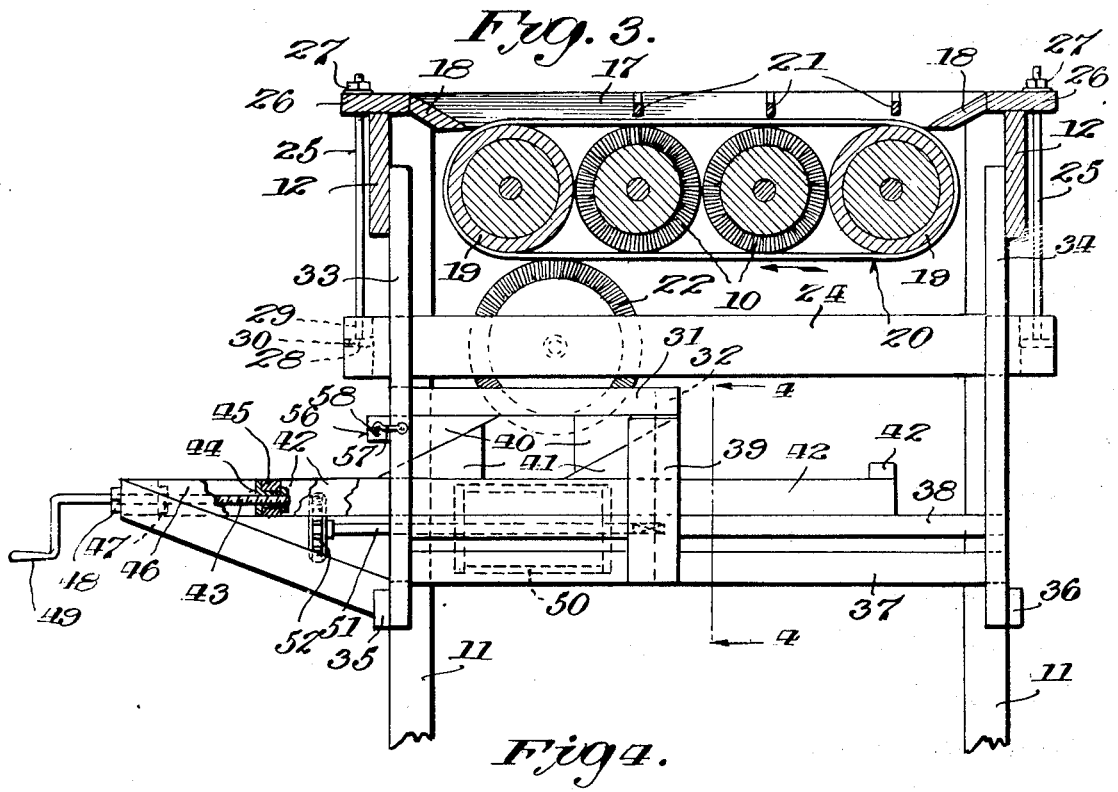
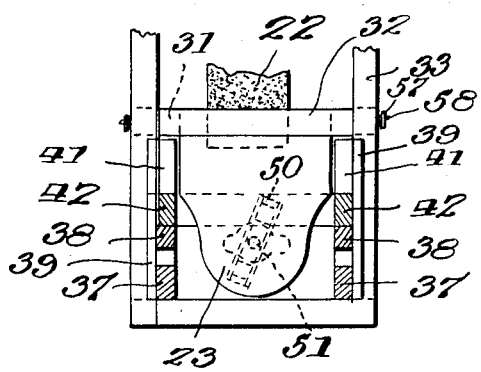
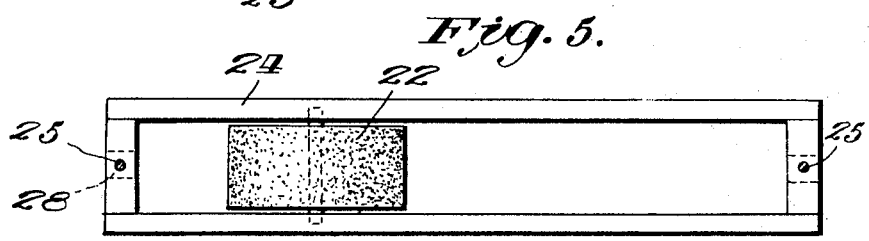
Inventor
H. C. Ricketts,
By Steward & McKay
his Attorneys Patented Aug. 26, 1924.

1,506,718

UNITED STATES PATENT OFFICE.

HOMER CHARLES RICKETTS, OF WINTER HAVEN, FLORIDA, ASSIGNOR TO BROGDEX COMPANY, OF WINTER HAVEN, FLORIDA, A CORPORATION OF FLORIDA.

APPARATUS FOR TREATING FRUIT AND THE LIKE.

Application filed June 7, 1923. Serial No. 644,022.

*To all whom it may concern:*

Be it known that I, HOMER C. RICKETTS, a citizen of the United States, residing at Winter Haven, county of Polk, and State of Florida, have invented certain new and useful Improvements in Apparatus for Treating Fruit and the like; and I do hereby declare the following to be a full, clear, and exact description of the invention, such as will enable others skilled in the art to which it appertains to make and use the same.

This invention relates to apparatus for treating fruit and the like; and it relates more particularly to apparatus for applying a protective or preservative material to fruit, or the like.

The invention is concerned more particularly with the treatment of fruit, especially citrus fruit such as oranges, tangerines, grapefruit and lemons, with coating material, effective when properly applied, to protect the fruit for a long time from rotting, withering, losing flavor or otherwise deteriorating, and hence to preserve the fruit in its original fresh, plump, sound and general salable condition.

Compositions consisting chiefly of a waxy substance, such as paraffin wax, associated with a solvent or liquid vehicle of oily character, either volatile or non-volatile, such as gasoline, benzine, light mineral oils known as "white oils," medicinal oils, and the like, have been found suitable for use in the fruit-treatment referred to. In the treatment of fruit with such compositions, a suitable quantity of the material is initially applied to the fruit and some form of rubbing or brushing means employed to evenly distribute the applied material in a thin, uniform and smooth coating over its surface.

A primary object of the invention is to provide in an apparatus of the general character of that disclosed and claimed in the application of Charles M. Jamieson, Serial No. 536,552, filed February 14, 1922, and in the application of Homer C. Ricketts, Serial No. 538,424, filed February 23, 1922, certain improvements in the means for initially applying coating material to the fruit antecedent to the brushing action which distributes the applied material uniformly over the fruit in a film-like coating.

In both the Jamieson and the Ricketts apparatus referred to, parallel revoluble brush rolls, of the well known Stebler-Parker type of polisher, are employed as the fruit-brushing means to effect the formation of the coating from the material initially applied to the fruit. In the Ricketts apparatus, coating material is by a suitable transfer roll, specifically a brush-roll, transferred from the available supply directly to the fruit-brushing rolls, the transfer roll depending into the supply and engaging the fruit-brushing rolls to effect such transfer; and the fruit brushing rolls thus supplied with the coating material perform the dual function of initially applying the material to the fruit and rubbing or brushing the same in a coating over its surface. The treatment of fruit with a preservative coating has been practiced with success by this Ricketts apparatus but there is a tendency in the operation of the apparatus to overloading and clogging of the brushes with the material initially applied thereto.

In the Jamieson apparatus, as distinguished from the Ricketts apparatus, the coating material is initially applied to the fruit on its way to the brushes. An endless traveling carrier belt is the specific form of applicator there employed, the belt moving through a supply container to receive by adherence a quantity of the coating material and outwardly therefrom across the path of the feeding movement of the fruit to the brushes to apply the material to the fruit. In this apparatus, some form of roll mechanism is employed to wipe excess of coating material from the belt and to spread the remaining quantity thereon. While this Jamieson apparatus has also been successfully employed in treating fruit with a preservative coating material, it presents the disadvantage of requiring, for its most effective operation, the maintenance of a large body of the coating material for the travel of the belt therethrough. The employment of the wiping or "doctor" roll engaging the carrier or applicator belt also presents certain disadvantages, mainly those of increased complication of mechanism and a tendency to waste of material.

A particular object of my present invention is to combine in an improved apparatus certain advantageous structural features found separately in the Jamieson and Ricketts apparatus in such a way as to avoid the objectionable features of apparatus-construction and operation referred to as incident to both.

My invention contemplates the employment of an applicator in the form of an endless traveling carrier presenting a surface adapted to receive a spread of the material and to apply that material to the fruit by moving across the path of its feed to the brushing means, as in the Jamieson apparatus, a supply container for the fluent coating material, and rotatable transfer means, preferably of the brush roll type as in the Ricketts apparatus, engaging the carrier to transfer material thereto from the supply in a uniformly thin spread on the carrier surface. The novel apparatus also includes means for adjusting and controlling the relative positions of the supply container and the rotatable transfer means in order to regulate the amount of coating material applied to the fruit. In practice, this may be most conveniently accomplished by adjustably mounting the rotatable transfer means in such manner that its engaging pressure on the carrier or applicator surface may be varied at will. Desirably, also, the supply container is mounted for independent adjustment relative to the transfer roll, such adjustment permitting advancing the container to positions rendering possible not only regulable but more complete utilization of its contents.

The arrangement of parts thus outlined, including particularly the employment of a traveling carrier for applying the material to the fruit in the advance of the latter thereacross and a brush roll for supplying the material to the carrier surface in initially spread condition, results in advantageous features of apparatus-construction and operation not found in either the Jamieson or Ricketts apparatus or, so far as I am aware, in any apparatus of the prior art. The advantageous features of the novel construction include certainty and uniformity of operation with the use of a minimum quantity of the fluent material, the necessity of but a small available supply of the material, and the avoidance of waste and clogging of the brushes. A particularly advantageous feature of the transfer roll in association with the traveling carrier is the initial application by the transfer roll directly upon the carrier surface of that precise predetermined minimum spread of the material most effective to present to the fruit its required supply, thus avoiding the use of additional mechanism in the nature of scrapers, "doctor" rolls, or the like, otherwise required to remove excess material.

The invention will be best understood from the description hereinafter given of a typical concrete embodiment thereof exemplified in the apparatus shown in the accompanying drawings forming a part hereof. It is to be understood, however, that the typical embodiment hereinafter described is merely illustrative and that within the broad scope of the invention are included other specific constructions capable of functioning in accordance with the principles here involved.

Referring to the drawings:

Fig. 3 is a transverse vertical section on the line 3—3 of Fig. 2;

Fig. 4 is a view of a portion of the apparatus partly in elevation and partly in section on the line 4—4 of Fig. 3;

Fig. 5 is a top plan view of a certain brush-roll and mounting therefor, employed in the apparatus.

Figure 1:
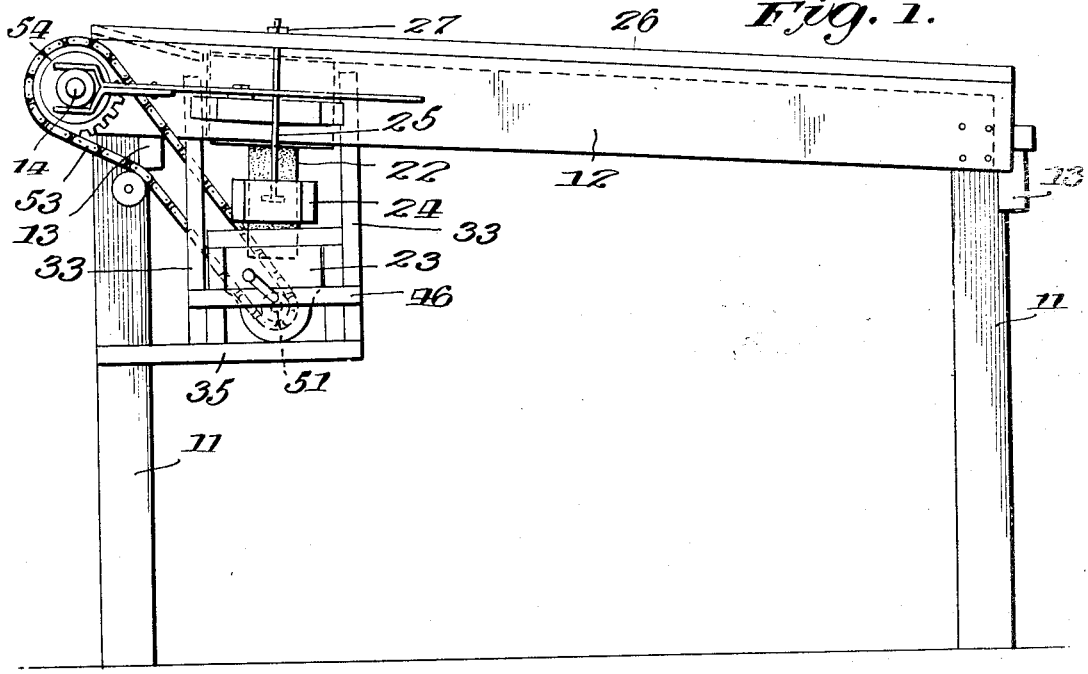
Fig. 1 is a side elevation of apparatus constructed in accordance with my invention.
Figure 2:
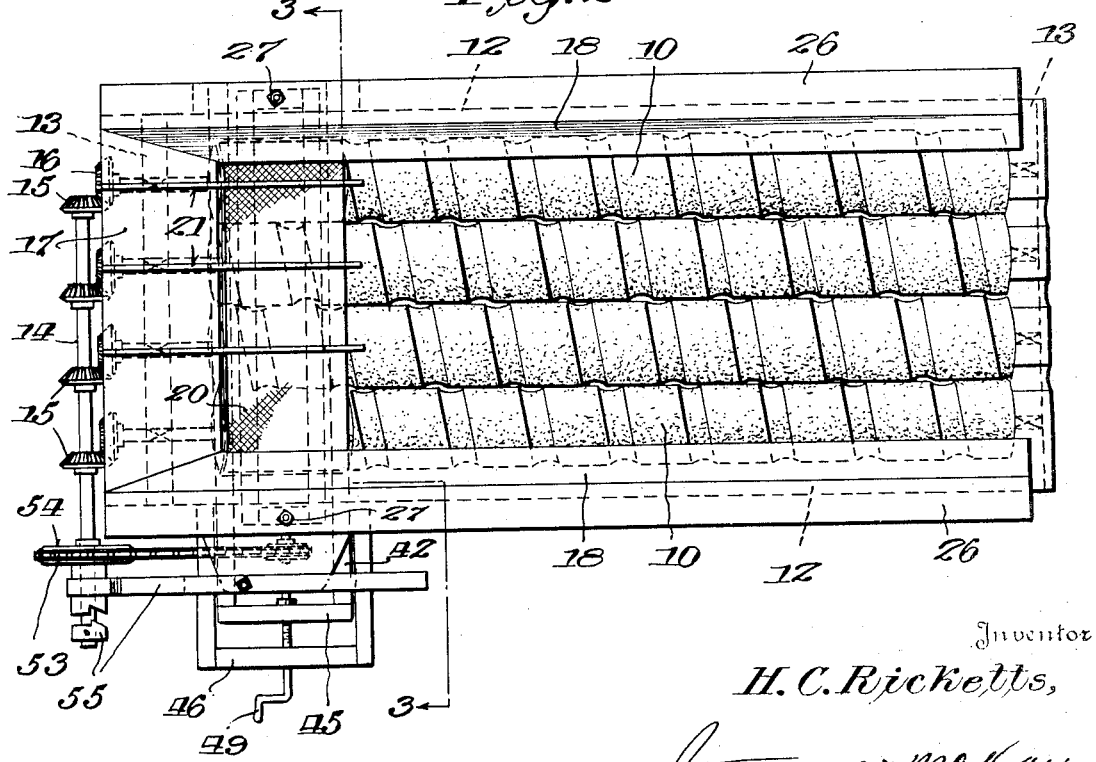
Fig. 2 is a top plan view of the same.

In the construction chosen to illustrate the principles of the invention, the rubbing or brushing mechanism is of the inclined parallel brush-roll type of which the well-known Stebler-Parker polisher is a typical example. In the present instance, the inclined parallel brush rolls of this type of polisher are indicated generally at 10. A plurality of such rolls may be provided, four being shown by way of example, mounted in the main frame work of the machine. Such framework comprises the uprights 11, the side members 12 and the end members 13. These brush rolls are suitably journaled at their ends in the end members 13 of the framework, as indicated in Fig. 2, and are driven at the proper speed and in the same direction of rotation from the driving shaft 14 by means of cooperating bevel gears 15, 16. The rotary brush rolls 10 may be of the usual type in which the rubbing or brushing surfaces are constituted by horse-hair bristles, for example, said rolls cooperating in pairs to provide between the rolls of each pair a trough-like runway for fruit gently sloping from the upper or receiving end of the polisher to the lower or discharge end. The inclination of the rolls is shown in Fig. 1, the receiving or feed end of the apparatus, as viewed in that figure, being disposed at the left and the discharge end at the right. The usual type of feeding chute, inclined toward the brush rolls to advance the fruit in a rolling movement thereto, is indicated at 17 (Figs. 2 and 3). The side walls of the chute are extended to form side bars 18 inwardly inclined to the crowns of the two outer brush rolls of the group along their entire length, as shown in Figs. 2 and 3.

The means for initially applying the coating material to the fruit comprises an endless traveling carrier or applicator belt functioning to convey supplies of the material into the path of travel of the fruit in its forward feeding movement to the brush-roll runways.

In the illustrated embodiment of the novel apparatus, the carrier or applicator belt is driven by the brush rolls of the polisher. The upper or receiving end portions of the two outside brush rolls of the polisher are formed into pulleys 19, as shown in Fig. 3. Over the pulleys 19 is trained an endless belt 20 of canvas, leather or the like adapted to receive a spread of the fluent coating and preservative material, the belt 20 extending transversely of the receiving end portions of the rolls as shown in Figs. 2 and 3, with its upper run horizontal in the direction of travel of the belt and inclined transversely of that direction of travel at the angle of inclination of the brush rolls.

With the arrangement described, the upper run of the belt is disposed with one side edge closely adjacent the chute board 17 and the opposite side edge disposed directly over the upper or receiving end portions of the brush runways, so that the fruit in the forward rolling movement imparted to it by the chute board advances therefrom directly across the upper run of the belt, aided by the transverse inclination of said belt, to the brush runways.

To evenly distribute the fruit to the brush runways, guide rails 21 may desirably be provided, mounted on the chute board 17 and extending slightly above and across the path of travel of the belt 20, substantially in line with the crowns of the brush rolls of the apparatus.

In the present illustrative embodiment of the invention, the rotatable transfer means for supplying a spread of the fluent coating and preservative material to the applicator or carrier belt for application of that material to the fruit, comprises a brush roll 22 mounted below the belt to engage its outer surface and a supply container 23 for the fluent material mounted below the brush roll 22, the arrangement being such that the brush roll depends into the fluent material in the container below and frictionally engages the applicator or carrier belt above. The brush roll 22, is therefore frictionally driven by the applicator or carrier belt, and in its driven movement of rotation takes up coating material from the supply container and transfers the same to the belt upon which it applies the material in a thin spread due to the brushing action of the roll upon the surface of the belt. The brush roll 22 may therefore be termed a transfer roll or an applying roll.

In the present illustrative form of my novel apparatus, the means for varying the quantity of the coating material delivered from the available supply for application to the fruit takes the form of independent adjustable mountings for the transfer roll and the supply container of the coating material. The adjustable mounting for the transfer roll is such as to enable an adjustment of that roll toward or away from the applicator or carrier belt whereby the pressure and brushing action of the roll upon that belt may be varied to vary the thickness of spread of the coating material thereon. The adjustable mounting for the supply container is such as to enable an adjustment of that container toward or away from the transfer roll whereby the quantity of coating material taken up by that roll may be varied and whereby also, by an advance of the container, decreasing supplies therein may be utilized.

The adjustable mounting for the transfer roll comprises a rectangular mounting frame 24, in the side members of which the brush roll 22 is journaled, as shown, particularly in plan view in Fig. 5. The mounting frame 24, in its assembled position in the apparatus, as shown in Fig. 3, is disposed beneath and parallel with the lower run of the applicator or carrier belt and transversely of the series of polisher rolls. It extends across the entire width of the apparatus and slightly therebeyond so that its end members are in position to engage supporting rods 25 depending from side bars 26 mounted upon the uprights 11 and side members 12 of the main framework of the apparatus.

The supporting rods 25, one at each side of the apparatus, extend upwardly loosely through bores in the side bars 26, and their upper ends are screw-threaded for engagement with nuts 27 to permit of vertical adjustment of the rods and to hold them in their adjusted positions. The end members of the mounting frame of the brush roll are each provided with an outwardly opening lateral recess 28 (shown in dotted lines in Figs. 3 and 5), and a bore 29 vertically extending from that recess through the upper face of the member. The lower end of each of the supporting rods 25 is also threaded to engage an internally threaded nut, and in assembling the mounting frame of the brush roll in its supported position, the nut, indicated at 30 in Fig. 3, is inserted in the lateral recess 28 and the end of the rod is projected through the bore 29 into engagement with the nut and the rod then turned to secure the mounting.

The arrangement described affords a mounting for the transfer brush of simple construction and ease of assembly and disassembly, which always presents the brush roll in uniform contact with the applicator or carrier belt across the entire width of the roll, and which permits a fine adjustment of the engaging pressure of the roll upon the belt.

The container 23 for the supply of the fluent coating material comprises a main body portion, of the contour in end elevation shown in Fig. 4, with curved bottom, which body portion is affixed to and depends from a rim-like rectangular frame having side members 31 and end members 32.

The supply container, with its rim-like rectangular frame, is adjustably and removably mounted in a supplemental framework extending from the main framework of the apparatus. Such supplemental framework comprises two pairs of vertical end members 33 and 34, affixed at their upper ends to the side boards 12 of the main framework of the machine, and cross supports 35, 36, anchored to standards 11 of the main frame of the apparatus, and joining the lower ends of the vertical members 33, 34, respectively. Lower side rails 37, one on each side, extend between and join the oppositely disposed vertical members 33, 34, as shown in Figs. 3 and 4; and spaced a short distance thereabove, additional side rails 38 are similarly arranged. Upright members 39 one on each side, as shown in Figs. 3 and 4, are affixed to the side rails 37, 38 and extend transversely thereof and upwardly, and function to brace the intermediate portion of the supplemental framework here referred to and also to serve as lateral guides for certain moving parts in the manner later to be described.

As shown in Fig. 4, the main body portion of the supply container 23 is inset from the side members 31 of its framework rim, and depends between the side rails 37 and 38 of the supplemental frame, which side rails are in vertical alignment with the rim members 31, referred to.

Various means for adjusting the supply container in its supporting framework may be employed. In the specific example here given, an inclined plane or wedge and a screw mechanism cooperating therewith are provided for the adjustment of the container. Attached to the lower or bottom edge of each side member 31 of the container rim are blocks 40 (Fig. 3) having inclined lower faces adapted to cooperate with blocks 41 having complementary inclined faces and independently mounted upon a rectangular framework 42 horizontally slidable transversely of the apparatus.

The side members of the slidable frame 42 are supported upon the side rails 38 of the supplemental framework, as shown particularly in Figs. 3 and 4. And, as also there shown, the lower edge surfaces of the side members 42 slidably engage the rails 38 while their outer side surfaces slidably engage the upright members 33 and the intermediate upright braces 39 of the supplemental framework.

The sliding movement of the rectangular framework 42 to raise or lower the supply container 23 may be effected, for example, by means of a screw 43 working in a threaded bushing 44 in an end member 45 of the framework 42, as shown in Fig. 3, parts of the framework being shown as broken away for better illustration of this mechanism. As there shown, said screw is rotatable in the outward end portion of a stationary member 46 rigidly mounted upon and extending from the supplemental framework referred to, the screw being held against longitudinal movement by collars 47, 48. A crank 49 is provided for manual operation of the screw to move the frame 42 in either direction.

It is clear from the arrangement of parts as viewed in Fig. 3, that a movement bodily of the frame 42 to the right moves the blocks 41 with respect to the blocks 40 in a direction lowering the supply container 23 and that a movement bodily of the frame 42 to the left causes an elevation of the container.

It is desirable to maintain the constituents of the coating material in the supply container in a thoroughly mixed condition. In the illustrative apparatus a suitable agitating or stirring device is employed for this purpose. This agitating or stirring device comprises a pair of blades 50 rotatably mounted on a shaft 51 in the depending portion or channel in the bottom of the supply container. The shaft 51 is journaled in the end walls of the container, as shown in dotted lines in Fig. 3, with one end of the shaft projecting outwardly of the supplemental framework in which the container is mounted, upon which end a sprocket 52 is mounted, to be driven by the chain 53 from the sprocket 54 mounted on the main drive shaft 14 of the apparatus. A suitable clutch and lever mechanism, indicated generally at 55, serves to start or discontinue the operation of the agitator or stirrer when desired.

A cross-beam 56 (Fig. 3) is provided, designed to be removably mounted transversely against the upright members 33 of the supplemental framework, for example, as by a pin and latch arrangement, 57, 58, so as to releasably lock the supply container from endwise movement outwardly of its mounting in the supplemental framework, that is to the left as the parts are viewed in Fig. 3. Upon removal of the cross-beam 56, and withdrawal of the screw 43, the rectangular framework 42 can be pulled outwardly, that is to the left as the parts are viewed in Fig. 3, with the supply container supported thereon, when the supply container can be entirely removed if desired.

In using the apparatus for forming a protective and preservative coating upon fruit, the fruit is fed to the upper end of the apparatus over the chute board 17, the chute board imparting a rolling movement to the fruit toward the brush runways between the polisher rolls. The fruit in its advance, rolls over the carrier or applicator belt 20 and receives an adhering supply of the coating material by contact with the spread of the material on that belt, the transfer brush or the supply container or both being adjusted vertically to supply to the belt the thickness of spread of the coating material effective to initially apply to the fruit that precise quantity of the material most advantageous in forming the coating by the subsequent rubbing or brushing action of the polisher rolls. The fruit, with the initial application of the coating material thereon, advances directly from the carrier or applicator belt to the brush runways, and in the rolling and turning progress of the fruit along these runways the coating material is distributed uniformly over its surface in the required film-like coating by the brushing action of the rolls.

What I claim is:

1. Apparatus for coating fruit comprising the combination, with rubbing or brushing means, and means for feeding fruit toward said rubbing or brushing means, of means for initially applying coating material to said fruit on its way to said rubbing or brushing means, said applying means comprising an element having a surface extending into the path of feeding movement of said fruit whereby said fruit traverses said surface, a driven brush-roll for applying coating material to said surface and means for supplying fluent coating material to said brush-roll.

2. Apparatus for treating fruit comprising, in combination, an endless-surface driven carrier means, and driving mechanism therefor, a brush roll in engagement with the surface of the said carrier means, means for supplying fluent coating material to said brush roll for transfer to said surface of said carrier means, means arranged to project fruit to be coated across the surface of said carrier means and in contact with coating material thereon, and means arranged to receive from said carrier means fruit so projected and to distribute adhering material thereover.

3. Apparatus for treating fruit comprising, in combination, a traveling carrier belt, a rotatable brush engaging said belt and means for supplying fluent coating material to said brush, means arranged to project fruit to be coated across said belt in contact with coating material thereon, and means arranged to receive fruit so projected and operative to distribute adhering coating material thereover.

4. Apparatus for coating fruit comprising, in combination, brushing or polishing means having a plurality of parallel brush rolls cooperating to provide a runway for the fruit between each two adjacent rolls, an endless traveling carrier belt arranged adjacent the receiving ends of said brush rolls and presenting a surface for rolling movement thereover of the fruit advancing to said runways, and means for supplying a coating material to said surface including a revoluble brush roll contacting with said belt and means for supplying coating material to said brush roll.

5. Fruit treating apparatus comprising in combination with brush roll mechanism and means for feeding fruit thereto, of a driven belt carrier for coating material having a path of travel disposing the belt of said carrier in contact with fruit advancing to said brush roll mechanism, a brush roll for spreading coating material upon said belt, means rotatably mounting said brush roll in engaging contact with said belt, means to adjust the engaging pressure of said brush roll upon said belt, and means for supplying fluent coating material to said brush roll.

6. Fruit treating apparatus comprising in combination with brush roll mechanism and means for feeding fruit thereto, of a driven belt carrier for coating-material having a path of travel disposing the belt of said carrier in contact with fruit advancing to said brush roll mechanism, an open container for fluent coating material disposed beneath said belt, and transfer-roll mechanism depending into said container and engaging said belt to transfer coating material from said container to said belt.

7. Fruit treating apparatus comprising in combination with brush roll mechanism and means for feeding fruit thereto, of a driven belt carrier for coating material having a path of travel disposing the belt of said carrier in contact with fruit advancing to said brush roll mechanism, an open container for fluent coating material disposed beneath said belt, a brush roll for spreading coating material upon said belt rotatably mounted to extend into said container and into engagement with said belt to transfer coating material from said container in a spread upon said belt, and means including a screw adjustment for variably positioning said brush roll to vary its engaging pressure upon said belt.

8. Apparatus for coating fruit comprising, in combination, brushing or polishing means including a plurality of parallel inclined brush rolls cooperating to provide a runway for the fruit between each two adjacent rolls, a pulley upon the upper end of each of the two outer rolls of said plurality, an endless belt trained over said pulleys and transversely of said rolls, an open supply container for fluent coating material mounted beneath said belt and a brush roll rotatably mounted between said belt and said container to frictionally engage said belt and to depend into the supply of fluent coating material in said container.

9. In an apparatus for coating fruit, the combination with a traveling belt arranged at an inclination to cause rolling movement of articles over the surface of said belt, a rotatable brush engaging said belt and means for supplying fluent coating material to said brush.

10. Apparatus for coating fruit comprising the combination, with rubbing or brushing means, and means for feeding fruit toward said rubbing or brushing means, of means for initially applying coating material to said fruit on its way to said rubbing or brushing means, said applying means comprising an element having a surface extending into the path of feeding movement of said fruit whereby said fruit traverses said surface, a source of supply for coating material, and means for transferring coating material therefrom to said surface.

11. Apparatus for treating fruit comprising, in combination, an endless-surface driven carrier means, and driving mechanism therefor, a rotary member arranged to engage the surface of said carrier means, means for supplying fluent coating material to said rotary member for transfer to said surface of said carrier means, means arranged to project fruit to be coated across the surface of said carrier means and in contact with coating material thereon, and means arranged to receive from said carrier means fruit so projected and to distribute adhering material thereover.

12. Apparatus for treating fruit comprising, in combination, a traveling carrier belt, a rotatable transfer member engaging said belt and means for supplying fluent coating material to said transfer member, means arranged to project fruit to be coated across said belt in contact with coating material thereon, and means arranged to receive fruit so projected and operative to distribute adhering coating material thereover.

In testimony whereof I hereunto affix my signature.

HOMER CHARLES RICKETTS.